(12) United States Patent
Ratho et al.

(10) Patent No.: US 11,983,093 B2
(45) Date of Patent: May 14, 2024

(54) TRACKING STATUS OF MANAGED TIME SERIES PROCESSING TASKS

(71) Applicant: Amazon Technologies, Inc., Seattle, WA (US)

(72) Inventors: Devesh Ratho, Seattle, WA (US); Ketan Vijayvargiya, Redmond, WA (US); Ahmed Gamal Hamed, Mill Creek, WA (US); Syed Furqhan Ulla, Kirkland, WA (US); Sadanand Murthy Sachidananda, Bothell, WA (US); Mohammed Saad Ather, Sammamish, WA (US); Jill Blue Lin, Berkeley, CA (US); Alfred Bruno Herbst, Ann Arbor, MI (US); Gaurav Rajendra Kataria, Lynnwoood, WA (US); Ankita Verma, San Francisco, CA (US)

(73) Assignee: Amazon Technologies, Inc., Seattle, WA (US)

(*) Notice: Subject to any disclaimer, the term of this patent is extended or adjusted under 35 U.S.C. 154(b) by 77 days.

(21) Appl. No.: 17/703,803

(22) Filed: Mar. 24, 2022

(65) Prior Publication Data

US 2023/0305945 A1 Sep. 28, 2023

(51) Int. Cl.
*G06F 11/36* (2006.01)

(52) U.S. Cl.
CPC ........ *G06F 11/364* (2013.01); *G06F 11/3612* (2013.01)

(58) Field of Classification Search
CPC ............................ G06F 11/364; G06F 11/3612
See application file for complete search history.

(56) References Cited

U.S. PATENT DOCUMENTS

| 8,640,015 B2 | 1/2014 | Ide et al. |
| 11,150,974 B2 | 10/2021 | Velipasaoglu et al. |
| 2016/0378615 A1* | 12/2016 | Cohen .................... G06F 11/00 714/19 |
| 2019/0034836 A1 | 1/2019 | Chari et al. |
| 2019/0235941 A1 | 8/2019 | Bath |
| 2021/0073204 A1* | 3/2021 | Liang .................. G06F 11/3409 |
| 2023/0129280 A1* | 4/2023 | Otake .................... G05B 19/05 717/109 |

FOREIGN PATENT DOCUMENTS

| WO | 2020125929 A1 | 6/2020 |
| WO | 2022046211 A1 | 3/2022 |

OTHER PUBLICATIONS

U.S. Appl. No. 17/364,823, filed Jun. 30, 2021, Ranjith Kumar Bodla, et al.
International Search Report and Written Opinion dated Jul. 10, 2023 in PCT/US2023/015727, Amazon Technologies, Inc., pp. 1-13.

* cited by examiner

*Primary Examiner* — Matthew M Kim
*Assistant Examiner* — Kyle Emanuele
(74) *Attorney, Agent, or Firm* — S. Scott Foster; Kowert, Hood, Munyon, Rankin & Goetzel, P.C.

(57) ABSTRACT

Execution status of managed time series processing tasks may be tracked. Status of a time series processing task that operations on different portions of a time series may be respectively captured. A request for the status of one of the portions of the time series with respect to the time series processing task may be received. The status may be identified and returned. For failed tasks, a failure reason may be generated by the time series processing system and included in a response with a failure status.

20 Claims, 9 Drawing Sheets

TRACKING STATUS OF MANAGED TIME SERIES PROCESSING TASKS

BACKGROUND

Time series data is generated by many different systems, services, or applications. Logs, for instance, may be time series data that can provide valuable insight into the operational behavior of a system. Given the increasing amounts of time series data that is generated, managed time series processing systems may be used to coordinate the ingestion, processing, and performance of various analyses or operations based on time series data in a way that provides a scalable capacity to utilize time series data for source system, service, or application improvement.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of tracking status of managed time series processing tasks are described herein. Time series data, which may describe various actions, events, or other data points corresponding to points in time, may offer valuable insights into the performance of various systems, services, applications, or organizations. One such example of an insight is anomalies. Anomalies (e.g., errors, unexpected values, or other changes) in time series data may point to service, application, or other system scenarios or issues that may become important issues to address. A technical error in an application, for example, could be indicated by a change in metrics or values emitted for the application. Anomalies may indicate changes in client or other user behavior that affect performance of a system, service, or application, such as an increased demand for various computational services (e.g., indicated by a changing number of request), which may impact system performance or user experience if not addressed.

Managed time series processing techniques may be applied to various different analysis techniques to handle the processing of time series data at scale (e.g., beyond the speed or capacity of a human evaluator to perform). For example, machine learning models may offer improvements to the detection of anomalies in time series data. Machine learning may refer to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. The application of machine learning models to provide inferences to detect anomalies in time series data may provide performance improvements for anomaly detection systems (e.g., in terms of accuracy and efficiency).

Machine learning models and/or other operations performed as part of processing time series data may be performed to provide continuous monitoring or other processing of time series data, which may drive the performance of various error handling, process management, resource management, or other client system operations (e.g., client systems, services, or applications that generate the time series data for processing). In order to understand the performance of a managed time series processing system, status information for time series processing tasks may be useful. However, time series processing tasks may include several and/or hidden operations, the performance of which may not be accessible to a client system of time series processing system. Moreover, some operations may rely upon external features or configurations, including configurations of data sources, evaluators, or other subsystems that are not directly managed or configured by a time series processing systems. Understanding if and/or when time series processing tasks fail, allows for corrections (or at least explanations) to account for the failure to be made. For example, in anomaly detection, alternative anomaly reviews may be performed if an anomaly review for a period of time series data was not completed in order to avoid missing a client system change that should have been made as a result of a finding (e.g., anomaly) in that time period. Therefore, insight into the reliability of time series processing systems may improve the performance of both the time series processing system itself (e.g., by allowing for corrections to be made external to the time series processing system outside of the time series processing system's control to be made) as well as client systems dependent upon the results of time series processing tasks.

Figure 1:
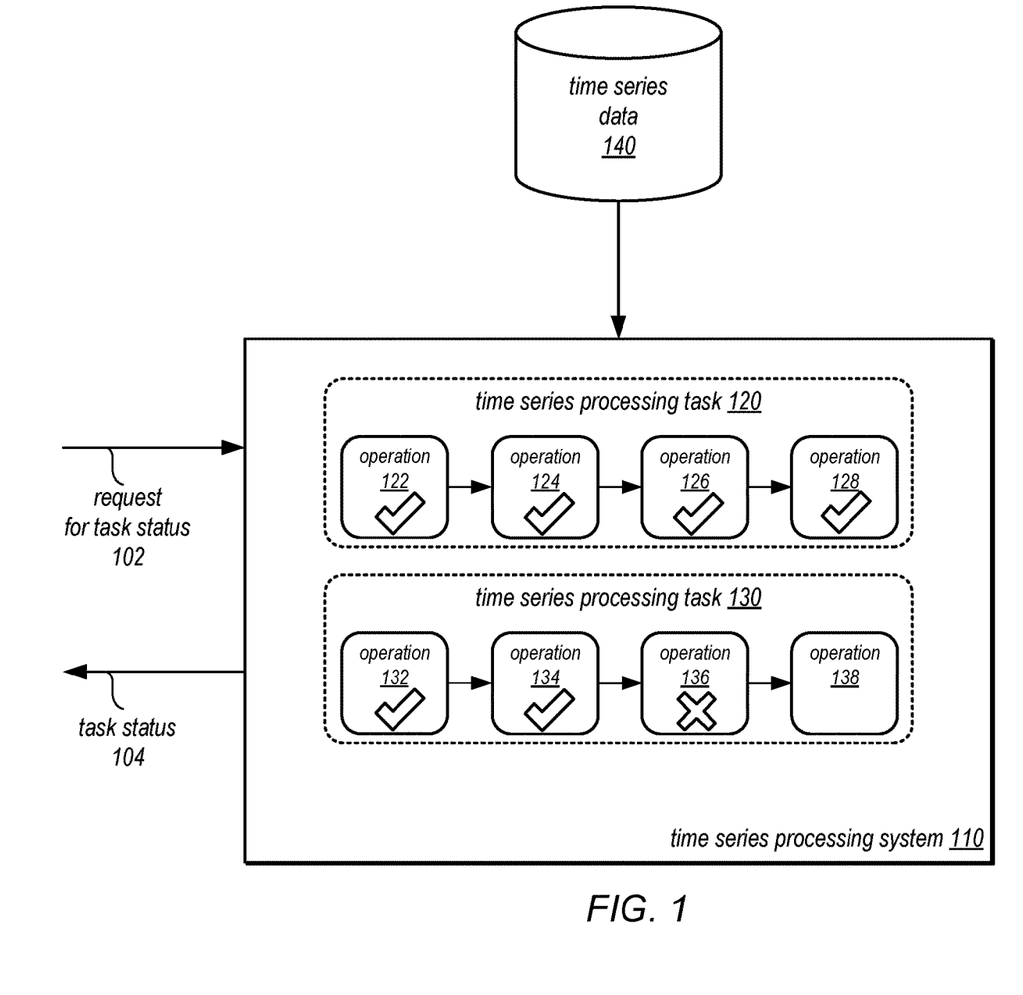
FIG. 1 illustrates a logical block diagram of tracking status of managed time series processing tasks, according to some embodiments.

FIG. 1 illustrates a logical block diagram of tracking status of managed time series processing tasks, according to some embodiments. Time series processing system 110 may implement various techniques for performing time series processing tasks, such as time series processing tasks 120 and 130. Time series processing tasks may perform various operations to evaluate, analyze, act or otherwise operate on time series data. For example, as discussed in detail below with regard to FIGS. 2-6, a time series processing task may be monitoring for anomalies in a time series using trained machine learning models.

Time series processing system 110 (e.g., computing system 1000 in FIG. 9 or multiple computing systems, such as those that may implement an anomaly detection service 210 in FIG. 2) may implement an interface to receive a request for task status, as indicated at 102. The status of time series processing tasks may be captured and provided in response to such a request, as indicated 104, according to the various techniques discussed in detail below with regard to FIGS. 3-8. For example, a time series processing task 120 may have various operations 122, 124, 126, and 128. The results of the different operations, such as success or completion results (e.g., as exemplified by the checkmark symbols) may be tracked and used to return a successful or completed status at 104 for task 120. Similarly, time series processing task 130 may have various operations 132, 134, 136, and 138. The results of the different operations may be tracked, which may indicate success until operation 135, which may have an error result (e.g., as indicated by the "x" symbol). As discussed in detail below, the failure status of the time series processing task 130 may be returned, which may indicate which portion of time series data (e.g., which range or associated timestamp) was being operated upon and a reason for the failure, which may include information indicative of internal or external causes. In some embodiments, a failure recommendation may also be included.

Please note that the previous description of a time series processing system and various requests is a logical illustration and thus is not to be construed as limiting as to the implementation of tracking status of managed time series processing tasks.

This specification continues with a general description of a provider network that implements multiple different services, including an anomaly detection service that may implement tracking status of managed time series processing tasks. Then various examples of the anomaly detection service, including different components/modules, or arrangements of components/module that may be employed as part of implementing the anomaly detection service are discussed. A number of different methods and techniques to implement tracking status of managed time series processing tasks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
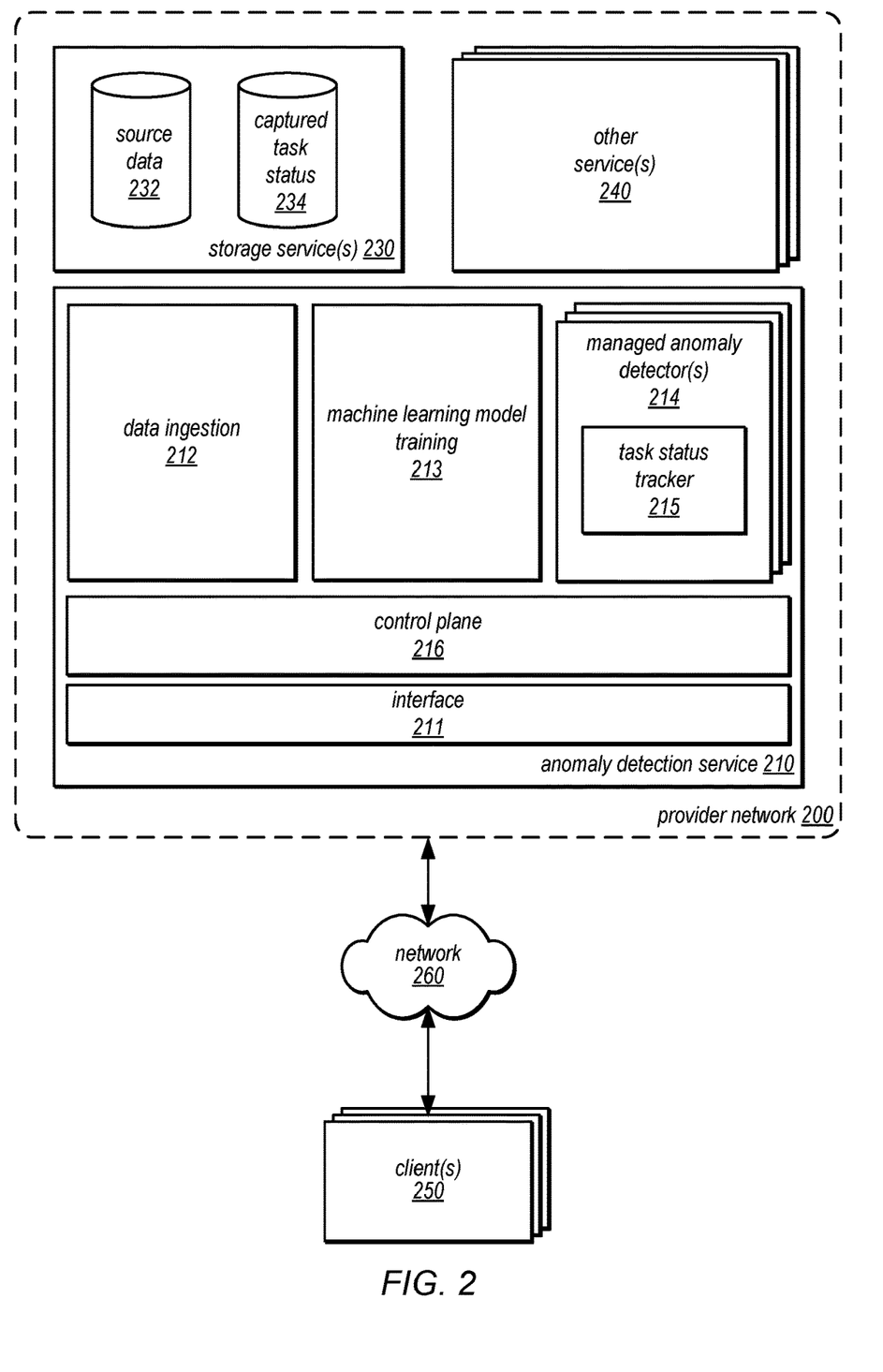
FIG. 2 illustrates an example provider network that may implement an anomaly detection service that may implement tracking status of managed time series processing tasks as part of detecting anomalies in time series data using machine learning models, according to some embodiments.

FIG. 2 illustrates an example provider network that may implement an anomaly detection service that may implement tracking status of managed time series processing tasks as part of detecting anomalies in time series data using machine learning models, according to some embodiments. Provider network 200 may be a private or closed system, or may be set up by an entity such as a company or a public sector organization to provide one or more services (such as various types of cloud-based storage) accessible via the Internet and/or other networks to clients 250, in one embodiment. Provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. Provider network 200 can provide convenient, on-demand network access to a shared pool of configurable computing resources that can be programmatically provisioned and released in response to customer commands. These resources can be dynamically provisioned and reconfigured to adjust to variable load. For example, in some embodiments, provider network 200 may implement various computing resources or services, such as object machine learning model-based search service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of machine learning model-based search service 210 may be implemented by a particular node or may be distributed across several nodes. In some embodiments, a given node may implement the functionality of more than one service system component (e.g., more than one data store component).

Anomaly detection service 210 may implement interface 211 to allow clients (e.g., client(s) 250 or clients implemented internally within provider network 200, such as a client application hosted on another provider network service like an event driven code execution service or virtual compute service) to send request to enable or view results of anomaly detection in time series data (e.g., using specific techniques as discussed in detail below) or obtain a prediction using a prediction model. For example, anomaly detection service 210 may implement interface 211 (e.g., a graphical user interface, programmatic interface that implements Application Program Interfaces (APIs) and/or a command line interface) may be implemented so that a client can request submit various requests, including the creation of anomaly detectors and task status results as discussed in detail below with regard to FIGS. 3-6.

Anomaly detection service 210 may implement data set ingestion 212, as discussed in detail below with regard to FIG. 3, in various embodiments. Data set ingestion 212 may obtain, transform from other formats into time series data, or otherwise access time series data (e.g., source 232 in storage service(s) 230) to train and/or detect for various anomalies. Anomaly detections service 210 may implement machine learning model training 213, as discussed in detail below with regard to FIG. 3, in some embodiments. Machine learning model training 213 may implement various training techniques, such as supervised or unsupervised training techniques to train machine learning models to detect anomalies in given time series data.

Anomaly detection service 210 may implement managed anomaly detector(s) 214, as discussed in detail below with regard to FIGS. 3 and 4, to use provisioned computing resources to apply trained machine learning models to detect anomalies. These managed anomaly detectors may dynamically managed the number and capabilities of computing resources in order to ensure that capacity to monitor the time series data for anomalies is sustained according to the configuration of the managed anomaly detector 214 (e.g., frequency of analysis, type of analysis, amount of data to be analyzed, etc.). These detections may be returned in text (e.g., in files, such as Comma Separated Values (CSV) files), via a programmatic interface (e.g., to be incorporated into other applications to use anomaly detection), warnings/alerts/notifications, and/or using various visualization techniques (e.g., graph displays). As discussed in detail below, managed anomaly detectors may implement task status trackers 215 to capture and store the status of detection tasks performed by managed anomaly detector(s) 214.

Anomaly detection service 210 may implement control plane 216, in various embodiments, to manage and/or orchestrate the performance of various features of anomaly detection service, such as data ingestion 212, machine learning model training 213, and managed anomaly detectors 214. For example, various workload management, security management, identity management, and/or other control functions may be handled by control plane 216. Dynamic provisioning may be implemented as part of control plane 215 to determine and provision a number of computing resources for detecting anomalies using machine learning models for time series data.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of source data 232, which may be accessed by and used for anomaly detection service 210 and capture task status 234 stored and provided in response to requests. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for time series forecasting service 210 (e.g., a request for task status, etc.). For example, a given client 250 may include a suitable version of a web browser, or may include a plug-in module or other type of code module that can execute as an extension to or within an execution environment provided by a web browser. Alternatively, a client 250 may encompass an application such as an application that may make use of anomaly detection service 210 to implement various applications. For example, a client 250 may get requested status of different tasks to determine whether to alter various client system operations, such requests may be sent via interface 211. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
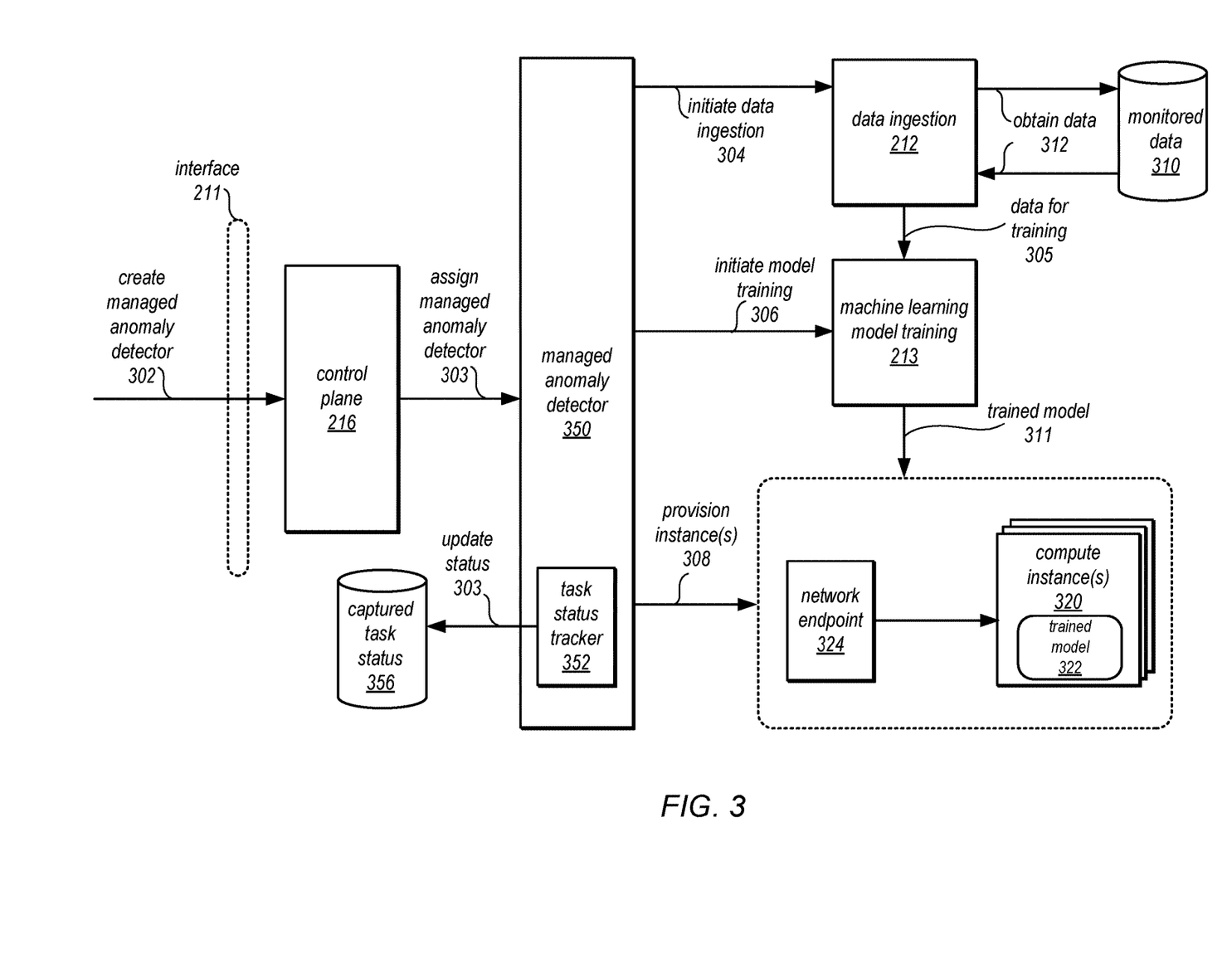
FIG. 3 illustrates a logical block diagram illustrating requests to create a managed anomaly detector for time series data, according to some embodiments.

FIG. 3 illustrates a logical block diagram illustrating requests to create a managed anomaly detector for time series data, according to some embodiments. As indicated 302, a request to create a managed anomaly detector may be received via interface 211. The request may be received through various types of interfaces, like a programmatic, graphical, or command-line, among others. The request may indicate the time series data (e.g., from one or multiple database, data storage systems, reporting systems, data streaming systems, or other sources of time series data), in some embodiments. Various features of the anomaly detection to be applied, such as the features, attributes, and/or dimensions in time series data, interval and/or frequency of new time series data, requested performance minimums, and/or various other information for performing anomaly detection may be provided as part of the request 302.

Control plane 216 may assign 303 a managed anomaly detector 350 (e.g., provision new computing resource(s) or allocate from a pool of available managed anomaly detector computing resources). Managed anomaly detector 350 may coordinate the initialization of and operation of anomaly detection. For example, managed anomaly detector 350 may initiate data ingestion 304 at data ingestion 212. For example, data ingestion 212 may obtain data 312 from the monitored data 310, in some embodiments. Data ingestion 212 may transform, convert, or otherwise reformat data that is not in time series format (or in a different time series format) into a time series format used by anomaly detection service 210.

Managed anomaly detector 350 may initiate model training 306 to machine learning model training 213, in some embodiments. For example, Managed anomaly detector 350 may configure or otherwise set up communications from data ingestion 212 state to receive time series data for training 305 a machine learning model. Managed anomaly detector 350 may determine the number of instances (or various other computing resources) and provision them, as indicated at 308 to utilize for evaluating time series data for anomalies. For example, a number of compute instances 320 hosting the trained model 322 (e.g., provided as a result of machine learning model training 213 as indicated at 311) may sit behind network endpoint 324.

Managed anomaly detector 350 may implement task status tracker 352. Task status tracker 352 may implement one or more features discussed below with regard to FIG. 8. For example, task status tracker may obtain results from various operations (e.g., initiate data ingestion 304, initiate model training 306, and provision instances 308) and determine from the status whether a failure (e.g., of the creation of a managed anomaly detector task) has occurred. Updates as to the status 303 of tasks may be stored in captured task status 356.

Figure 4:
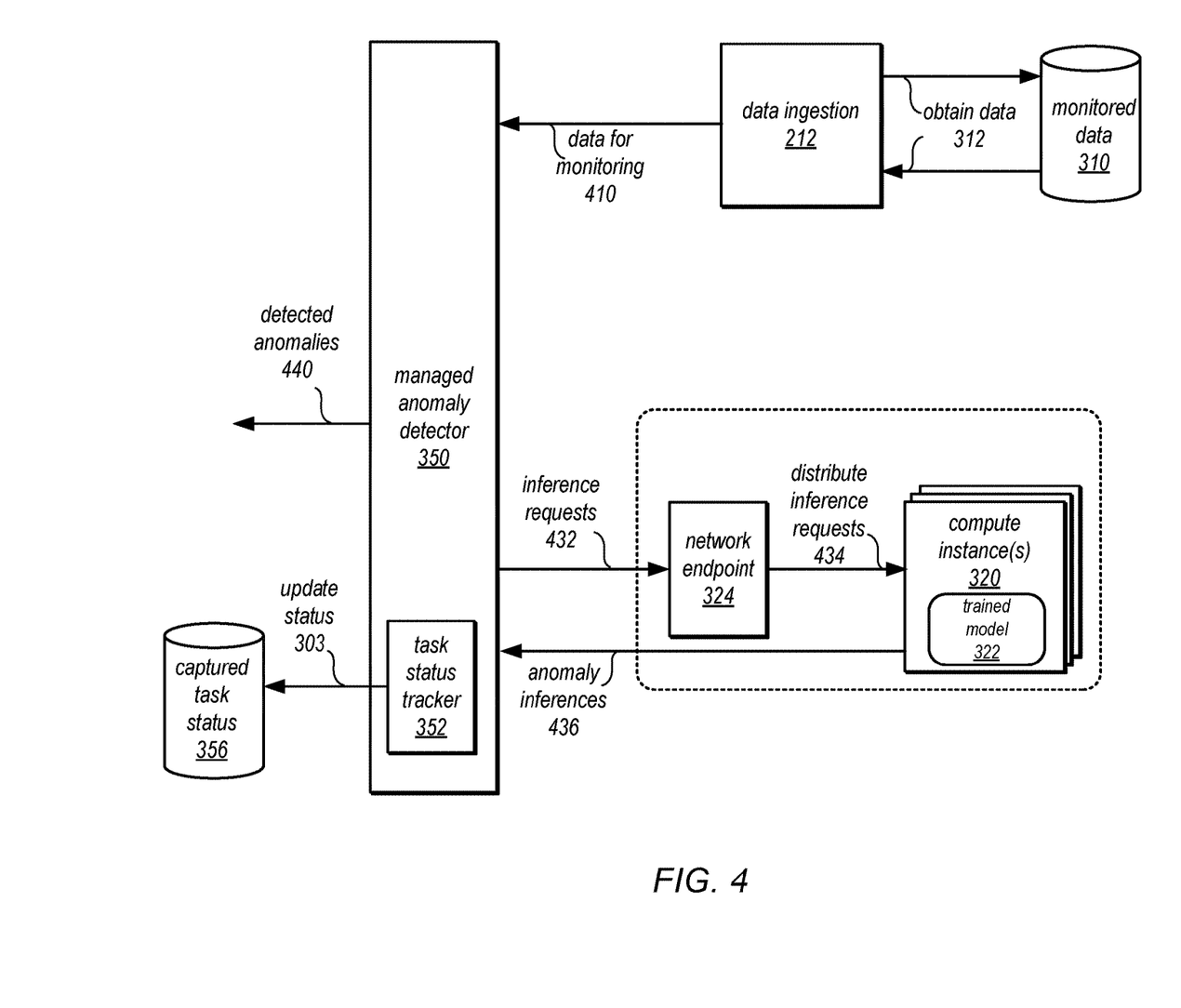
FIG. 4 illustrates a logical block diagram illustrating a managed anomaly detector evaluating time series data using provisioned resources to detect anomalies, according to some embodiments.

FIG. 4 illustrates a logical block diagram illustrating a managed anomaly detector evaluating time series data using provisioned resources to detect anomalies, according to some embodiments. Managed anomaly detector 350 may receive data for monitoring 410 as a result of data ingestion 212. From this data for monitoring, managed anomaly detector 350 may submit inference requests 432 to network endpoint 324. Network endpoint 324 may act as a receiving point for inference requests 432, which may be distributed 434 (e.g., according to a load balancing scheme) to compute instances 320. Anomaly inferences 436 may be returned and may include respective scores or other confidence values, in some embodiments. Managed anomaly detector 350 may apply various criteria, thresholds, or other information for identifying and detecting anomalies and providing them, as indicated at 440.

Managed anomaly detector 350 may implement task status tracker 352, as discussed above. Task status tracker 352 may implement one or more features discussed below with regard to FIG. 8. For example, task status tracker 352 may obtain results from various operations (e.g., obtain data for monitoring 410 and inference requests 432) and determine from the status whether a failure of a monitoring or other anomaly detection task has occurred. Update status 303 may be stored in capture task status 356.

Figure 5:
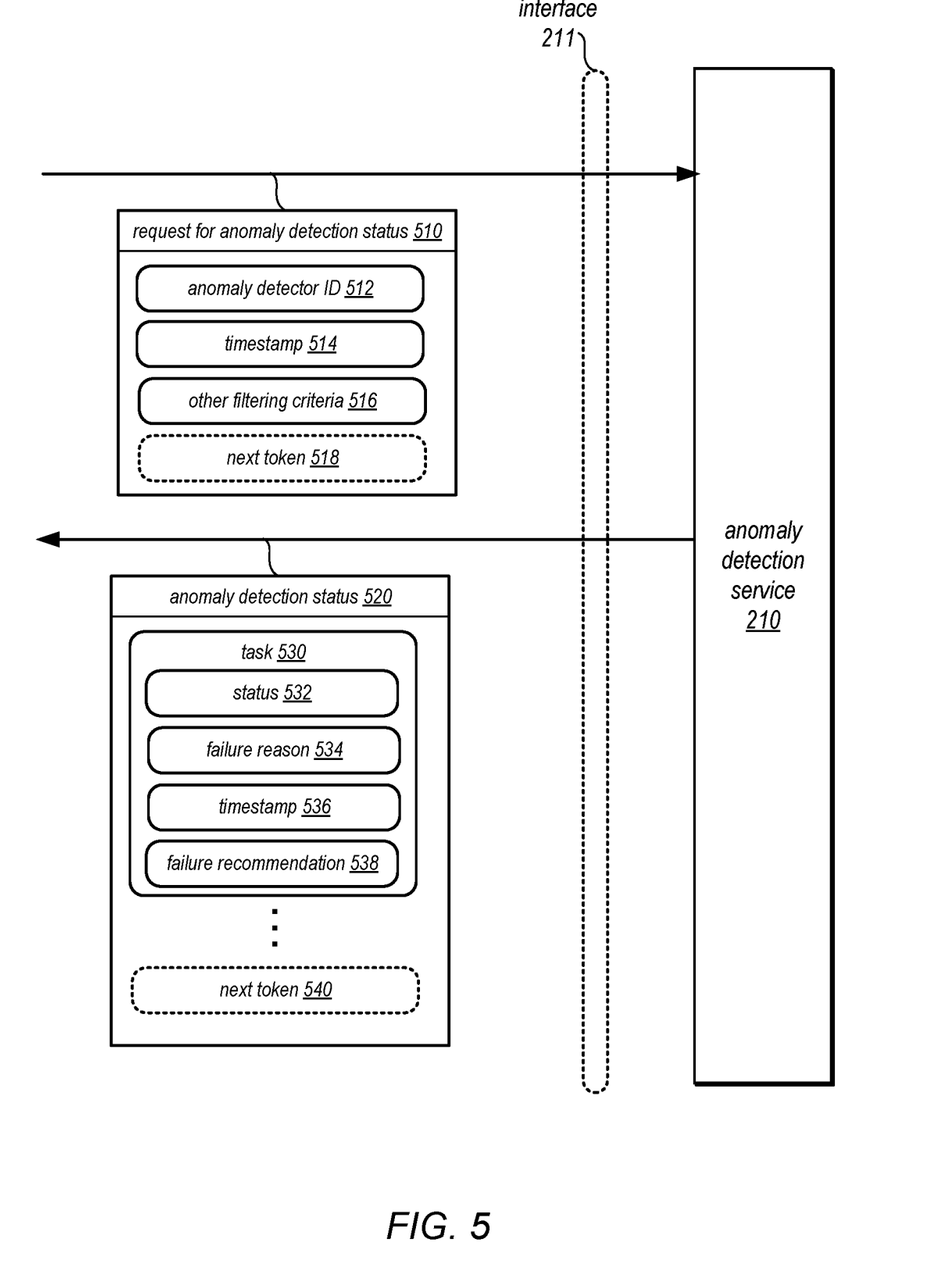
FIG. 5 illustrates example interface requests for anomaly detector task status, according to some embodiments.

FIG. 5 illustrates example interface requests for anomaly detector task status, according to some embodiments. A request for anomaly detection status 510 may be supported via interface 211 (e.g., as an API request or a command line request). The request may include various features, such as an anomaly detector identifier (ID) 512 (which may allow anomaly detection service 210 to distinguish between the various anomaly detectors created in a particular provider network account (and across provider network accounts). The request may include a timestamp 514, which may be used to specify which instance of task performance (e.g., which portion of time series data) a status is requested for. In various embodiments, timestamp 514 may not necessarily be specified. Instead, a most recent set of instances of task performance (or other automatic selection technique) may be used to determine which task statuses to return. In some embodiments, other filtering criteria 516 may be included, such as specific time ranges for tasks, specific statuses of tasks (e.g., "completed", "in-progress", "failed", or "pending"). In some embodiments, tokens, such as next token 518, may be supported to allow for pagination (e.g., grouping of results in batches). Thus next token 518 may indicate which batch of a previous status request to return in response.

Anomaly detection service 210 may lookup the various requested tasks instances according to the features of request 510. For example, the captured tasks statuses may be accessed in captured task status 356 using anomaly detector ID and timestamp(s) to obtain the status(es). In some embodiments, some portions of a response may be generated on demand, such as a failure reason or recommendation, while in other embodiments they may be stored along with other status information.

Anomaly detection status 520 may be a response to the request via interface 211. Status 520 may include respective sets of information included for each task. For example, task 530 may be the status of one instance (e.g., one performance) of a task, and may include information such as the status 532 (e.g., "pending", "in-progress", "completed", or "failed"), failure reason 534 (if applicable), timestamp 536 (or other indication of the portion of the time series data operated upon by the instance of the task 530), and failure recommendation 538 (if applicable). Task information may be repeated for each retrieved task, which may be different instances of the same task performed on different portions of the same time series (or another time series monitored by that task). Thus the respective status and other information for those other instances of the same task may be different than that information provided in task 530. As noted above, batch results may be returned or supported. Next token 540 may be used to support pagination of batch results (e.g., into separate batches), which may be accessed in a subsequent response using the returned next token 540.

Figure 6:
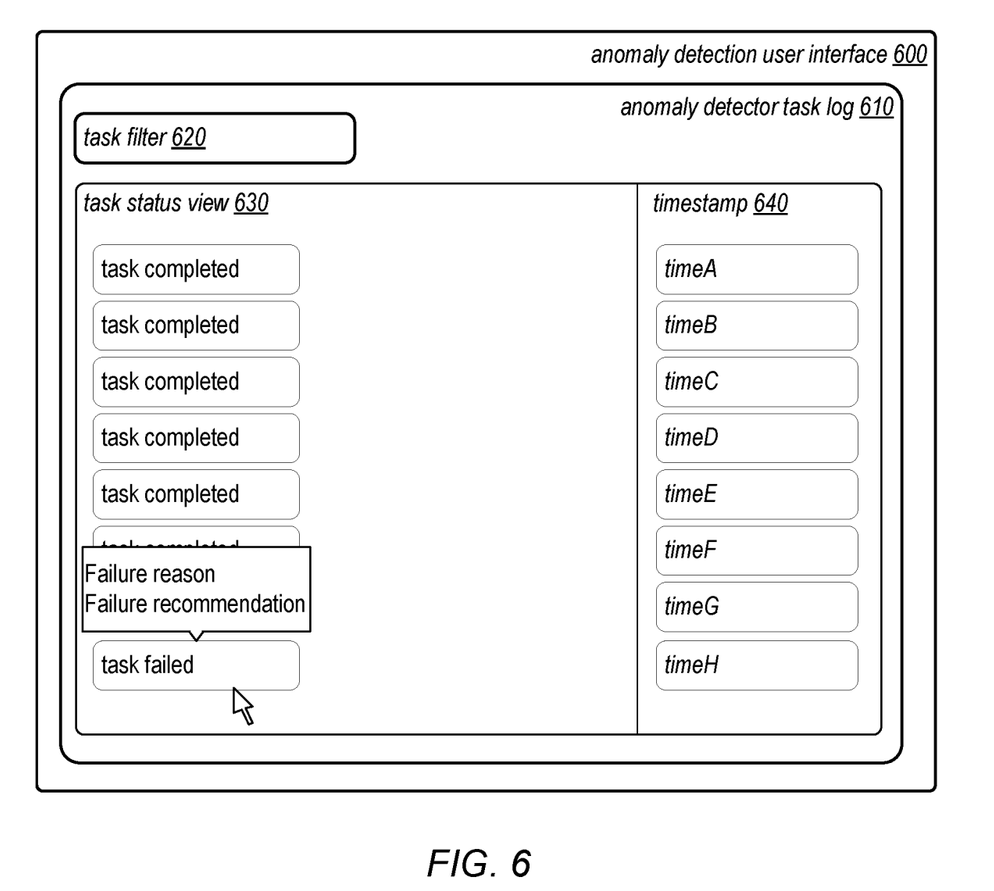
FIG. 6 illustrates an example user interface for anomaly detector task status, according to some embodiments.

FIG. 6 illustrates an example user interface for anomaly detector task status, according to some embodiments. Anomaly detection user interface 600 may be a graphical user interface implemented as part of a control console for anomaly detection service 210 (e.g., offered as a web-console). As part of anomaly detection user interface 600 may include an anomaly detector task log 610. This detector task log 610 may utilize the status requests, discussed above with regard to FIG. 5, to present task status information as part of task status view 630. Task status view 630 may include a batch of task instances with respective timestamps 640 (e.g., recent task instances, task instances ordered according to timestamp 640, etc.). In some embodiments, task status view 630 may allow for instances of the task to be selectable, such as indicated by the "task failed" instance, which may also display additional information including a failure reason and failure recommendation. Anomaly detector task log 610 may also include task filter 620 user interface element, which may allow for the filtering of task instances according to various features (e.g., time range, status type, such as "failed", or other features), which may refresh or affect the displayed instances of the task in task status view 630.

Although FIGS. 2-6 have been described and illustrated in the context of a provider network implementing an anomaly detection service, the various components illustrated and described in FIGS. 2-6 may be easily applied to other systems that utilize managed time series processing. As such, FIGS. 2-6 are not intended to be limiting as to other embodiments of tracking status of managed time series processing tasks.

Figure 7:
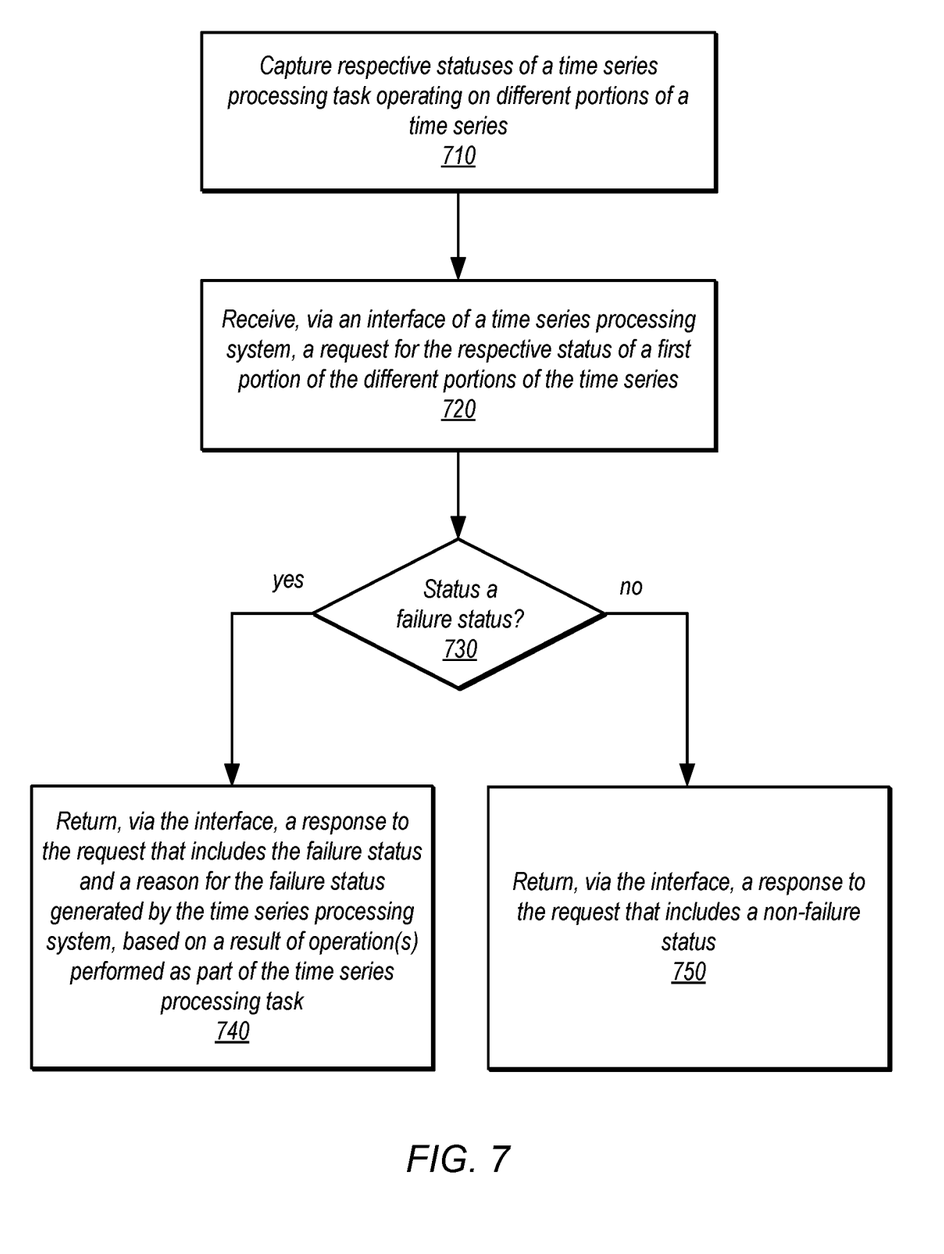
FIG. 7 illustrates a high-level flowchart of various methods and techniques to implement tracking status of managed time series processing tasks, according to some embodiments.

FIG. 7 illustrates a high-level flowchart of various methods and techniques to implement tracking status of managed time series processing tasks, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 710, respective statuses of a time series processing task operating on different portions of a time series may be captured, in some embodiments. Time series processing tasks may include various kinds of analyses, such as anomaly detection as discussed above with regard to FIGS. 2-6, as well as various other types analyses to drive client system operations (e.g., making various client system throughput modifications), predicting downstream capacity requirements in a client system, among other analyses or tasks more generally. The time series processing task may include various operations, as discussed above with regard to FIG. 1, which may leverage internal or external systems, subsystems, services, components, or components. For instance, as discussed above with regard to FIGS. 2-6, systems for data ingestion, machine learning model training, and machine learning model application to determine inferences, may be various operations that are invoked as part of performing a time series processing task. In other time series processing tasks, other operations may be performed (e.g., joining time series data with other data from other sources to inform the analysis). The time series processing task may be performed on different portions of the time series data in parallel, in some embodiments.

As discussed in detail below with regard to FIG. 8, the status of the time series processing task operating on different portions of the time series may include determining the results of these operations as performed with respect to a portion (e.g., range) of time series data. The captured statuses may be stored, in some embodiments, along with any additional information that is provided along with statuses, such as failure reasons and recommendations, as discussed below.

As indicated at 720, a request may be received via an interface of a time series processing system (e.g., time series processing system 110 in FIG. 1) for a status of a first portion of the time series. For example, a timestamp, time range or other identifier that maps to the first portion may be received (e.g., task execution number 123). Different types of interfaces, such as command line interfaces, graphical interfaces (e.g., similar to interface 610 discussed above with regard to FIG. 6), or programmatic interfaces (e.g., similar to those requests discussed above with regard to FIG. 5). The request may include various information to filter the results or configure the results provided. For instance, more than just the first portion of the time series may be requested (e.g., a batch or execution status requests). Status limitations, such as return those tasks with a "FAILURE" status may be included as part of the response. In some embodiments, the time series processing task may operate on different time series (e.g., obtained from different sources, such as different operational logs for different systems). Therefore, the same techniques discussed with regard to a time series task being performed on different portions of one time series may be performed with regard to different time series that are also operated upon by the same time series processing task.

The status of the first portion may be identified from the captured respective statues. For example, a lookup operation that accesses a data store (e.g., indexed by timestamp, time series identifier, and/or detector identifier) may be used to retrieve the status of the time series processing task. As indicated at 730, a determination may be made as to whether the status is a failure status. If yes, then as indicated at 740, response to the request may be returned that includes the failure status and a reason of for the failure status generated by the time series processing system based on a result of operation(s) performed as part of the time series processing task, in some embodiments. For example, the failure reason may identify the context around the operation (e.g., the input parameters) to a request that failed. In some embodiments, the failure reasons may be returned in a human-readable format (e.g., in a sentence written in a human language—as opposed to an error code or exception flag). Other information, such as whether the failure is internal (e.g., caused by the time series processing system and fixable by the time series processing system) or external (e.g., caused by a client configuration or other feature not fixable by the time series processing system) may be indicated.

If the status is not a failure, then, as indicated at 750, the response to the request may be returned via the interface that includes the non-failure status (e.g., pending, in-progress, completed, etc.). In some embodiments, the response may include other information such as the number of successfully processed time series portions (or other time series).

Figure 8:
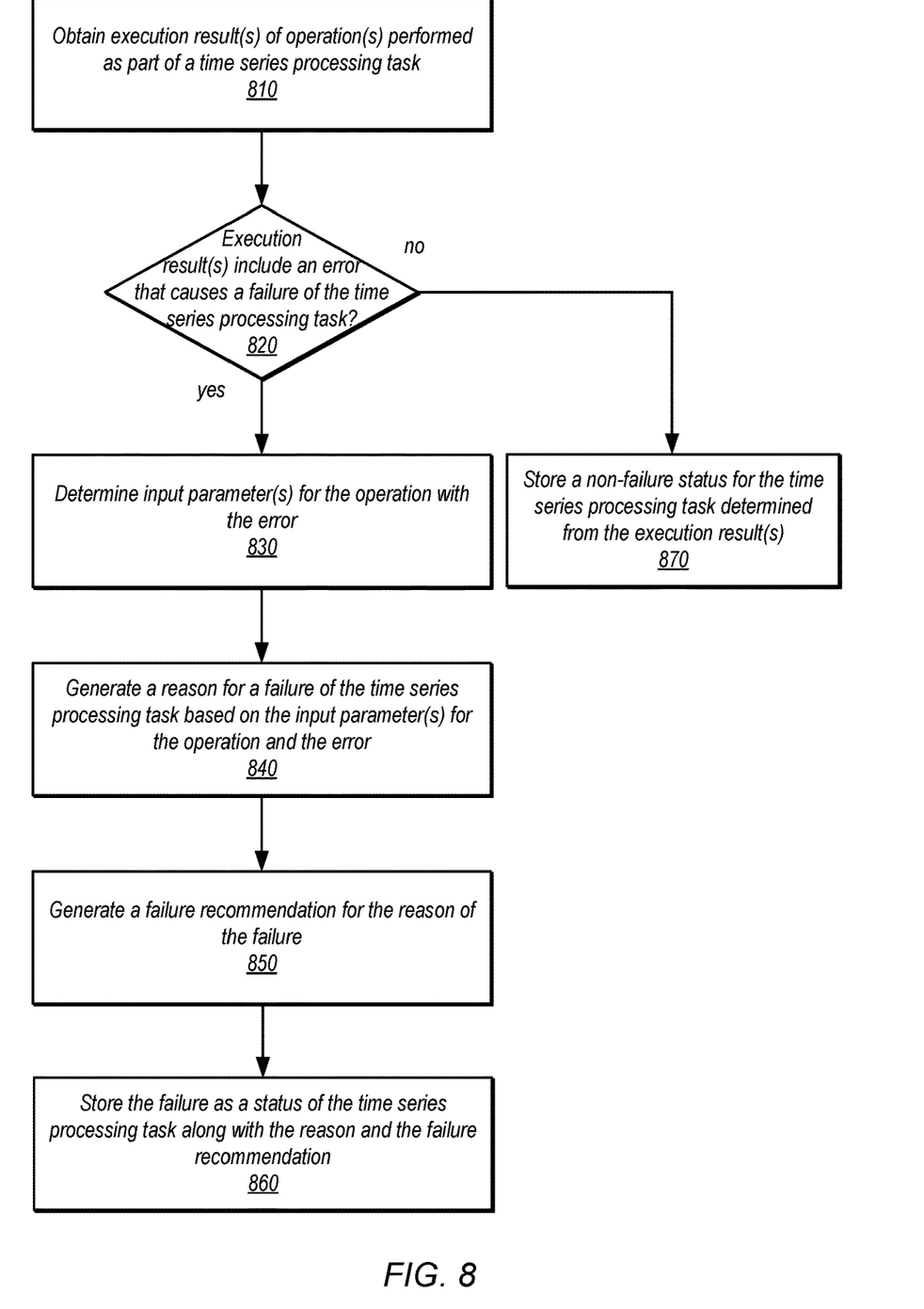
FIG. 8 illustrates a high-level flowchart of various methods and techniques to implement capturing status of managed time series processing tasks, according to some embodiments.

FIG. 8 illustrates a high-level flowchart of various methods and techniques to implement capturing status of managed time series processing tasks, according to some embodiments. As indicated at 810, execution result(s) of operation(s) performed as part of a time series processing task may be obtained, in some embodiments. For example, the processing task may include different operations that invoke components, such as different data retrieval or storage systems, alert or notification systems, responsive action systems (e.g., to automatically modify client systems), machine learning or other analysis systems, and so on. The results of submitting requests to these various different systems may be obtained by a managed anomaly detector or other managed time series processing system component that is directing the performance of the time series processing task. The execution results may include either success or error/failure responses, along with descriptive information providing error/failure codes, types, or other information that describes the operation result.

As indicated at 820, these execution results may be examined for an error that causes a failure of the time series processing task. If no error occurs (e.g., one that stops processing of the time series processing task), then a non-failure status for the time series processing task may be stored (e.g., "in-progress" or "completed").

If an error is detected, then as indicated at 830, the input parameters for the operation with the error may be determined, in some embodiments. For example, a workflow, configuration, or other information describing the time series processing task (e.g., a script, graph, or other data structure) may be used to determine what inputs are involved with the operation. These inputs may include features such as data files, data objects, requested functions, security or authorization credentials, or various other information used to perform the operation.

As indicated at 840, a reason for the failure may be generated based on the input parameter(s) for the operation and the error, in some embodiments. For example, failure reason generation rules may utilize decision trees or other models to direct analysis of the failure to generate the reason. For example, error codes may be interpreted or recognized as internal failures (e.g., correctable by the time series processing system) or external failures (e.g., not correctable by the time series processing system). Different failure reason generation models may be applied for internal or external failures. For instance, internal failures may generalize (e.g., for security or simplification reasons) the reason to indicate an internal failure that will be resolved by the time series processing system, whereas external failures may identify specific features, such as a failure to gain access to a specific data object (or item within a data object, such as a particular record in a database). The reason for the failure may be constructed as one or more sentences in a human readable language (e.g., instead of repeating or copying an exception or error code that caused the failure). In some embodiments, reason sentence templates corresponding to different identified failure reasons may be maintained so that once identified (e.g., via the decision trees), the various template features may be populated (e.g., using the input parameters).

As indicated at 850, a failure recommendation may be generated, in some embodiments. For example, various instructions to correct, alleviate, or remedy an external error (e.g., update access controls to allow time series processing system access, for instance) may be returned. Again, various recommendation generation rules, such as mapping failure types to predetermined recommendations may be used. In some embodiments, the recommendation may include hyperlinks or other content that can be selectable to automate correction or lead to the appropriate systems or tools to make correction according to the recommendation.

As indicated at 860, the failure status along with the reason (and if generated the failure recommendation) may be stored, in some embodiments. For example, a data store that indexes entries according to a timestamp and identifier of the time series processing task may be used to add an entry with the failure, reasons, and recommendation. In this way, a lookup can be performed using, for example, the identifier and timestamp at a later time to obtain the status, failure reason, and recommendation.

The methods described herein may in various embodiments be implemented by any combination of hardware and software. For example, in one embodiment, the methods may be implemented on or across one or more computer systems (e.g., a computer system as in FIG. 9) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
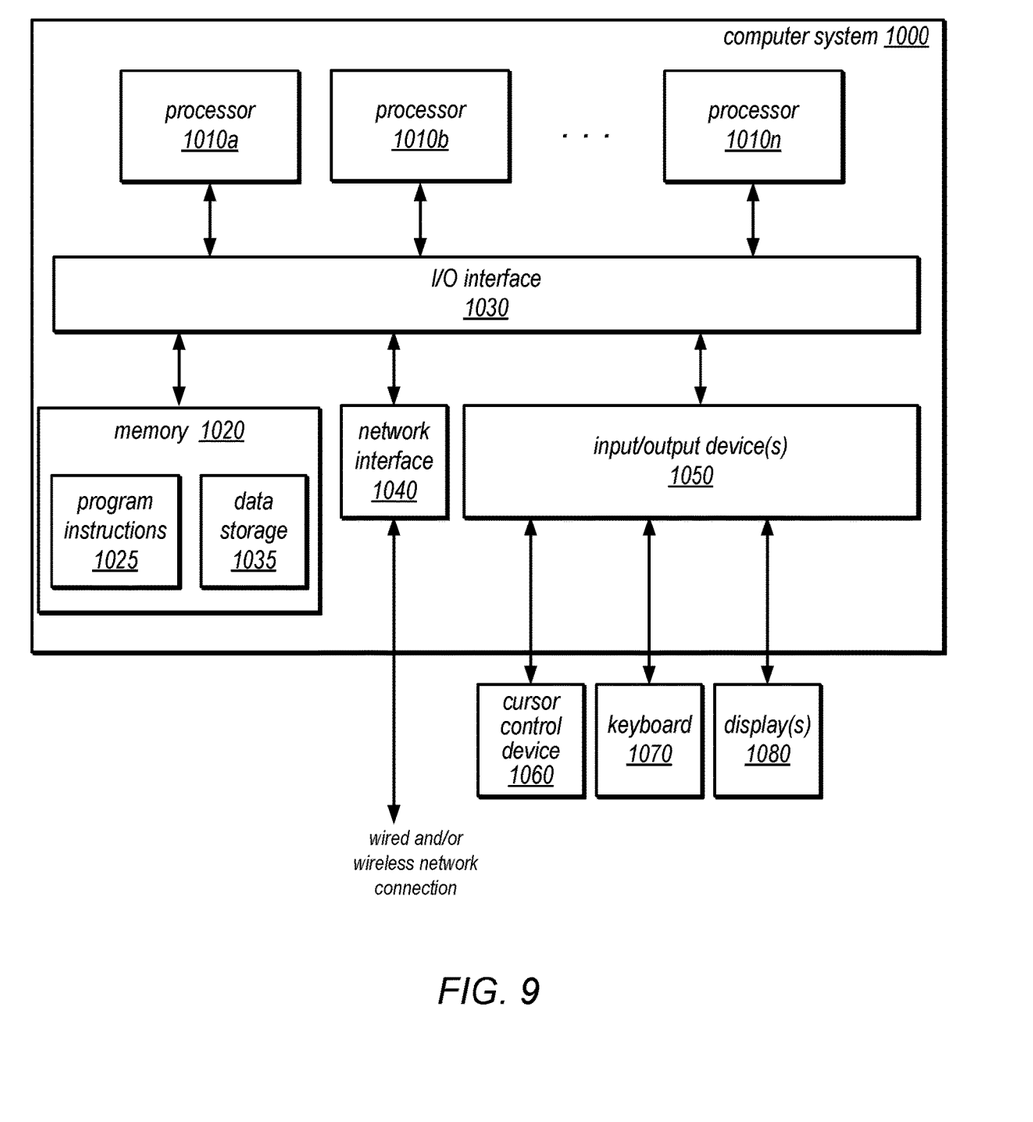
FIG. 9 illustrates an example system to implement the various methods, techniques, and systems described herein, according to some embodiments.

Embodiments of tracking status of managed time series processing tasks as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical techniques. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above that implement tracking status of managed time series processing tasks may be stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a time series processing system, configured to:
   capture respective statuses of a time series processing task operating on different portions of a time series;
   store the captured respective statuses of the time series processing task operating on the different portions of the time series;
   receive, via an interface of the time series processing system, a request for the respective status for a first portion of the different portions of the time series;
   access the stored respective status of the time series processing task to identify a failure status as the respective status of the time series processing task operating on the first portion of the time series; and
   return a response to the request that comprises the failure status and a reason for the failure status generated, by the time series processing system, based, at least in part, on a result of one or more operations performed as part of the time series processing task.

2. The system of claim 1, wherein the response to the request further comprises a failure recommendation generated by the time series processing system based, at least in part, on the failure reason.

3. The system of claim 1, wherein the request comprises one or more filter criteria that are used to determine the status of the first portion of the time series to return in response to the request.

4. The system of claim 1, wherein the time series processing system is an anomaly detection service offered as part of a provider network, wherein the time series processing task is performed by a managed anomaly detector implemented by the anomaly detection service and created in response to a request to create the managed anomaly detector received via an interface of the anomaly detection service.

5. A method, comprising:
   capturing, by a time series processing system, respective statuses of a time series processing task operating on different portions of a time series;
   receiving, via an interface of the time series processing system, a request for the respective status of a first portion of the different portions of the time series;
   identifying, by the time series processing system, a failure status as the respective status of the time series processing task operating on the first portion of the time series from the captured respective statuses of the time series processing task; and returning, via the interface of the time series processing system, a response to the request that comprises the failure status and a reason for the failure status generated, by the time series processing system, based, at least in part, on a result of one or more operations performed as part of the time series processing task.

6. The method of claim 5, wherein the response to the request further comprises a failure recommendation generated by the time series processing system based, at least in part, on the failure reason.

7. The method of claim 5, wherein the request and the response to request are formatted according to an Application Programming Interface (API).

8. The method of claim 5, wherein capturing the respective statuses of the time series processing task operating on different portions of the time series comprises:

for the first portion of the time series:
   obtaining the result of the one or more operations performed as part of the time series processing task;
   detecting an error for one of the one or more operations that causes the failure of the time series processing task;
   determining one or more input parameters for one of the one or more operations; and
   generating the failure reason based on the one or more input parameters and the error.

9. The method of claim 5, wherein the request comprises one or more filter criteria that are used to determine the status of the first portion of the time series to return in response to the request.

10. The method of claim 5, further comprising:

receiving, via the interface of the time series processing system, a second request for the respective status of a second portion of the different portions of the time series;

identifying, by the time series processing system, a completed status as the respective status of the time series processing task operating on the second portion of the time series from the captured respective statuses of the time series processing task; and returning, via the interface of the time series processing system, a second response to the second request that comprises the completed status.

11. The method of claim 5, wherein the response to the request is a batch of the respective statuses for further ones of the different portions of the time series.

12. The method of claim 5, wherein the failure reason indicates an external failure.

13. The method of claim 5, wherein the request and the response to request are performed to generate a graphical user interface that displays at least the status of the time series processing task performed with respect to the first portion of time series data.

14. One or more non-transitory, computer-readable storage media, storing program instructions that when executed on or across one or more computing devices cause the one or more computing devices to implement:

capturing, by a time series processing system, respective statuses of a time series processing task operating on different portions of a time series;

receiving, via an interface of the time series processing system, a request for the respective status of a first portion of the different portions of the time series;

accessing, by the time series processing system, the respective status of the time series processing task to identify a failure status as the respective status of the time series processing task operating on the first portion of the time series; and returning, via the interface of the time series processing system, a response to the request that comprises the failure status and a reason for the failure status generated, by the time series processing system, based, at least in part, on a result of one or more operations performed as part of the time series processing task.

15. The one or more non-transitory, computer-readable storage media of claim 14, wherein the response to the request further comprises a failure recommendation generated by the time series processing system based, at least in part, on the failure reason.

16. The one or more non-transitory, computer-readable storage media of claim 14, wherein, in capturing the respective statuses of the time series processing task operating on different portions of the time series, the program instructions cause the one or more computing devices to implement:

for the first portion of the time series:
   obtaining the result of the one or more operations performed as part of the time series processing task;
   detecting an error for one of the one or more operations that causes the failure of the time series processing task;
   determining one or more input parameters for one of the one or more operations; and
   generating the failure reason based on the one or more input parameters and the error.

17. The one or more non-transitory, computer-readable storage media of claim 14, wherein the request comprises one or more filter criteria that are used to determine the status of the first portion of the time series to return in response to the request.

18. The one or more non-transitory, computer-readable storage media of claim 14, wherein the failure indicates an internal failure of the time series processing system.

19. The one or more non-transitory, computer-readable storage media of claim 14, wherein the request and the response to request are performed to generate a graphical user interface that displays at least the status of the time series processing task performed with respect to the first portion of time series data.

20. The one or more non-transitory, computer-readable storage media of claim 14, wherein the time series processing system is an anomaly detection service offered as part of a provider network, wherein the time series processing task is performed by a managed anomaly detector implemented by the anomaly detection service and created in response to a request to create the managed anomaly detector received via an interface of the anomaly detection service.

* * * * *